United States Patent [19]
Balling

[11] Patent Number: 5,899,584
[45] Date of Patent: May 4, 1999

[54] ONE-TIME-USE CAMERA WITH FILM WINDING MOTOR CAPABLE OF BEING DISENGAGED TO FACILITATE FILM PREWINDING DURING CAMERA MANUFACTURE

[75] Inventor: Edward N. Balling, Rochester, N.Y.

[73] Assignee: Eastman Kodak Company, Rochester, N.Y.

[21] Appl. No.: 09/093,235

[22] Filed: Jun. 8, 1998

[51] Int. Cl.[6] .................................................. G03B 17/02
[52] U.S. Cl. ................................ 396/6; 396/388; 396/418
[58] Field of Search ............................... 396/6, 387, 388, 396/411, 418, 535

[56] References Cited

U.S. PATENT DOCUMENTS

| | | | |
|---|---|---|---|
| 3,860,197 | 1/1975 | Sugimori | 396/388 |
| 4,006,489 | 2/1977 | Aizawa et al. | 396/388 |
| 4,012,755 | 3/1977 | Arai | 396/388 |
| 4,171,892 | 10/1979 | Kozuki et al. | 396/388 |
| 4,339,189 | 7/1982 | Nakano | 396/213 |
| 4,529,282 | 7/1985 | Yamamoto | 396/388 |
| 4,738,524 | 4/1988 | Liew et al. | 396/388 |
| 4,959,672 | 9/1990 | Yoshino et al. | 396/418 |
| 5,565,945 | 10/1996 | Tobise et al. | 396/6 |
| 5,574,524 | 11/1996 | Petruchik | 396/411 |
| 5,612,758 | 3/1997 | Petruchik | 396/413 |

*Primary Examiner*—Eddie C. Lee
*Attorney, Agent, or Firm*—Roger A. Fields

[57] ABSTRACT

A one-time-use camera comprising a film cartridge, a filmstrip that has been prewound from the film cartridge into an unexposed film roll, and a film winding device rotatable to wind successive exposed sections of the filmstrip into the film cartridge, is characterized in that a film winding motor is supported for movement to have respective separate positions in the camera not engaged with the film winding device, to permit the filmstrip to be prewound from the film cartridge into the unexposed film roll, and engaged with the film winding device, for rotating the film winding device to wind each exposed section of the filmstrip into the film cartridge.

7 Claims, 6 Drawing Sheets

ONE-TIME-USE CAMERA WITH FILM WINDING MOTOR CAPABLE OF BEING DISENGAGED TO FACILITATE FILM PREWINDING DURING CAMERA MANUFACTURE

CROSS-REFERENCE TO RELATED APPLICATION

Reference is made to commonly assigned copending application Ser. No. 09/054,291 entitled ONE-TIME-USE CAMERA WITH MULTI-ADAPTER FIXTURE FOR MOTOR AND SELF TIMER, and filed Apr. 2, 1998 in the name of Edward N. Balling.

The cross-referenced application is incorporated in this application.

FIELD OF THE INVENTION

The invention relates generally to the field of photography, and in particular to motorized cameras. More specifically, the invention relates to a one-time-use camera with a film winding motor that can be disengaged to facilitate film prewinding during camera manufacture.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable exposure or frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer rotates the manual thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the exposure counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Problem

Typically, during original camera manufacture or used camera remanufacture, a fresh cartridge is placed in the cartridge receiving chamber and most of the unexposed filmstrip is prewound from the film cartridge into the other chamber. If it is decided to include a film winding motor in the one-time-use camera instead of the manual thumbwheel, the motor preferably should not be in winding engagement with the film spool inside the film cartridge when the unexposed filmstrip is prewound from the film cartridge, because it would be an impediment to unwinding rotation of the film spool.

SUMMARY OF THE INVENTION

A one-time-use camera comprising a film cartridge, a filmstrip that has been prewound from the film cartridge into an unexposed film roll, and a film winding device rotatable to wind successive exposed sections of the filmstrip into the film cartridge, is characterized in that:

a film winding motor is supported for movement to have respective separate positions in the camera not engaged with the film winding device, to permit the filmstrip to be prewound from the film cartridge into the unexposed film roll, and engaged with the film winding device, for rotating the film winding device to wind each exposed section of the filmstrip into the film cartridge.

DETAILED DESCRIPTION OF THE INVENTION

Figure 1:
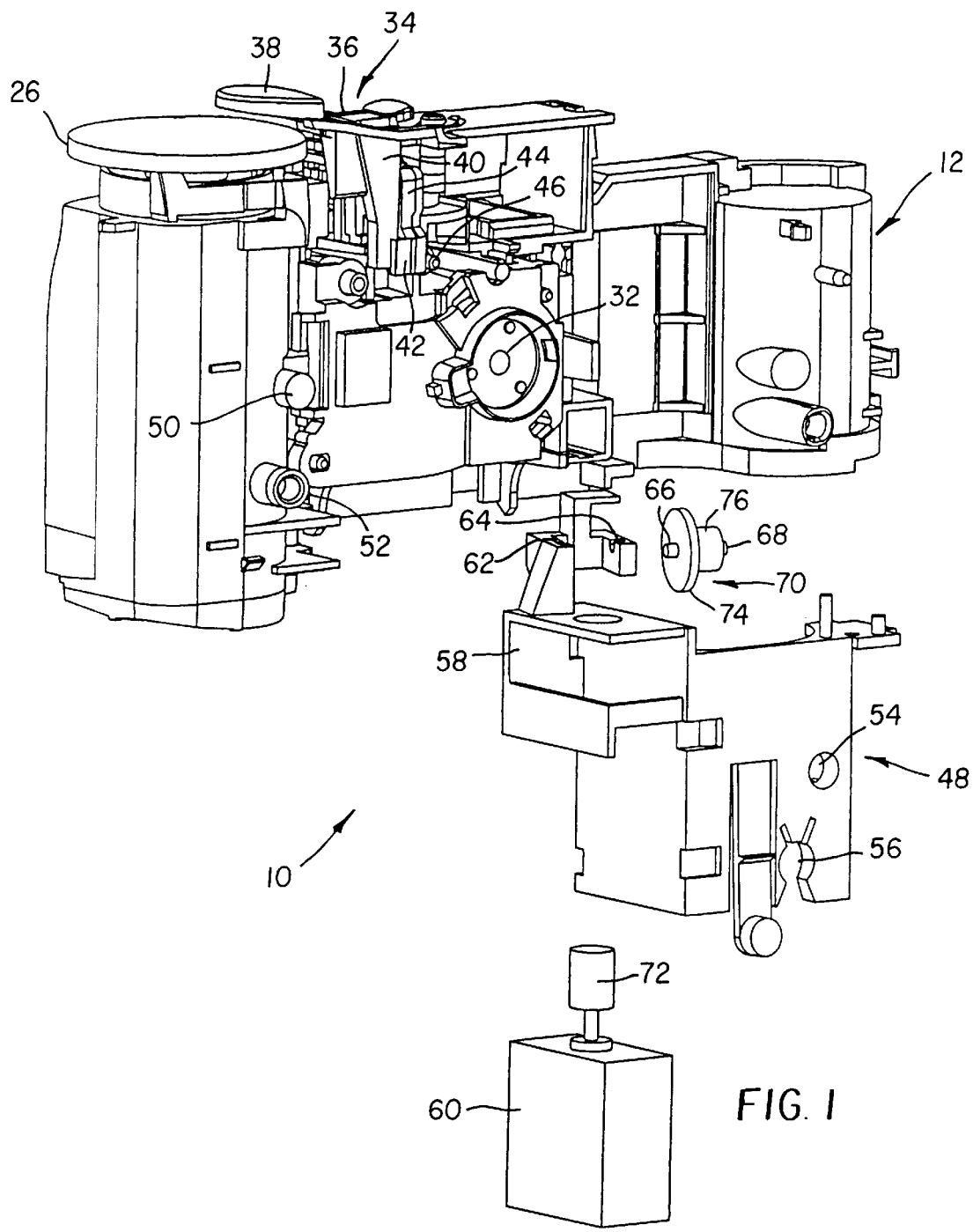
FIG. 1 is an exploded front perspective view of a one-time-use camera with a film winding motor according to a preferred embodiment of the invention.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 partially show a one-time use camera 10 including an opaque main body part 12. The main body part 12 has a rearwardly open cartridge receiving chamber 14 for a known "Advanced Photo System" film cartridge 16 and a rearwardly open film roll or film supply chamber 18 for an unexposed film roll 20. A backframe opening 22 is located between the cartridge receiving and film roll chambers 16 and 18, for exposing successive sections of a filmstrip 24 initially stored on the unexposed film roll 18 within the film roll chamber 18. A film winding ring gear 26 is rotatably supported on the main body part 12, with a depending coaxial stem 28 of the film winding ring gear in coaxial engagement with a protruding end of the film spool (not shown) in the film cartridge 16 within the cartridge receiving chamber 14. Winding rotation of the film winding ring gear 26 (counter-clockwise in FIG. 6) similarly rotates the film spool to wind each exposed section of the filmstrip 24 into the film cartridge 16. An exposure counter 30 provides a current count of the film sections that remain to be exposed.

A known shutter blade (not shown) is pivotally supported on the main body part 12 for pivotal opening and closing movement to momentarily uncover and then recover a front exposure opening 32 in the main body part 12 to allow ambient light into the backframe opening 22 to expose each film section. See FIGS. 1 and 2. A torsion return spring (not shown) urges the shutter blade to recover the front exposure opening 32. Opening movement of the shutter blade would be clockwise in FIG. 1, and closing movement of the shutter blade would be counter-clockwise in FIG. 1.

A shutter release component 34, shown in FIG. 1, is secured to the main body part 12 and has a resilient cantilevered beam 36 with a free end that is a manually depressible shutter release button 38. An actuating finger 40 depends from the cantilevered beam 36 to extend behind a right-angled tab 42 on a known metering lever 44. The metering lever 44 is pivotally supported on the main body part 12 and normally engages a known spring-driven high energy lever 46, pivotally supported on the main body part, to hold the high energy lever against the spring urging. When the shutter release button 38 is manually depressed, the cantilevered beam 36 is bent (beginning at the shutter release button) to make the actuating finger 40 swing counter-clockwise and in turn pivot the metering lever 44 counter-clockwise in FIG. 1. When the metering lever 44 is pivoted counter-clockwise, it releases the high energy lever 46 which then briefly strikes the shutter blade (not shown) to pivot the shutter blade open to uncover the exposure opening 32. The torsion return spring (not shown) for the shutter blade pivots the shutter blade closed to recover the exposure opening 32.

As shown in FIG. 1, a single-piece mount 48 can be secured to the main body part 12, adjacent the cartridge receiving chamber 14, by means of two integral projections 50 and 52 on the main body part that extend through respective holes 54 and 56 in the mount.

The mount 48 has an open pocket 58 for receiving a direct current film winding motor 60 and a pair of aligned cradle slots 62 and 64 for receiving respective coaxial shaft ends 66 and 68 to rotatably support a combination gear 70. A worm gear 72, which the film winding motor 60 directly rotates, meshes with an annular gear 74 of the combination gear 70 to in turn rotate the combination gear. A pinion gear 76 of the combination gear 70 meshes with the film winding ring gear 26 to windingly rotate that gear to in turn rotate the film spool (not shown) in the film cartridge 16 within the cartridge receiving chamber 14 to wind each exposed section of the filmstrip 24 into the film cartridge. See FIG. 6. Other details of the film winding motor 60 are provided in the cross-referenced application, which is incorporated in this application.

Figure 3:
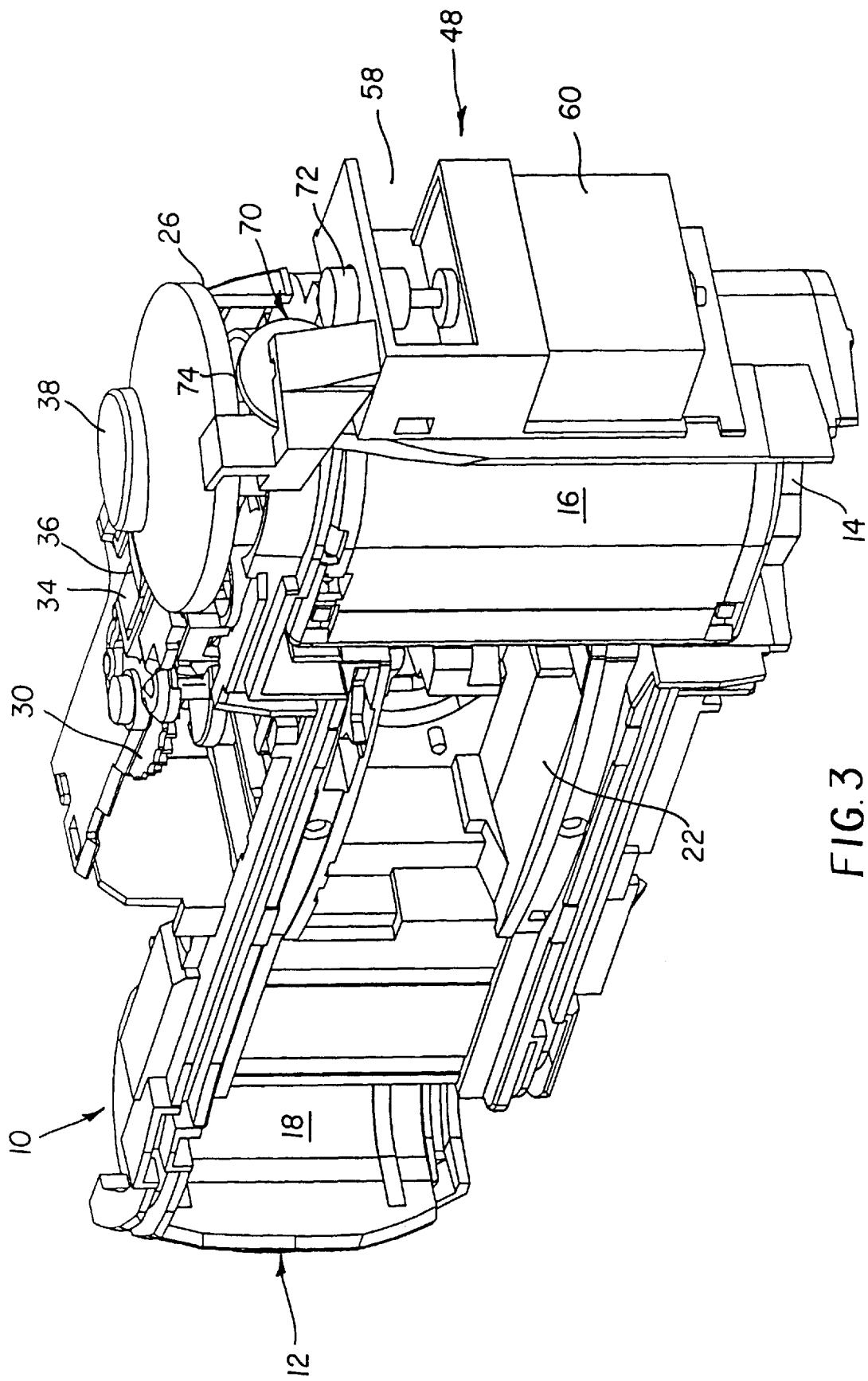
FIG. 3 is an assembled rear perspective view of the one-time-use camera, showing the film cartridge completely inserted into the camera.
Figure 6:
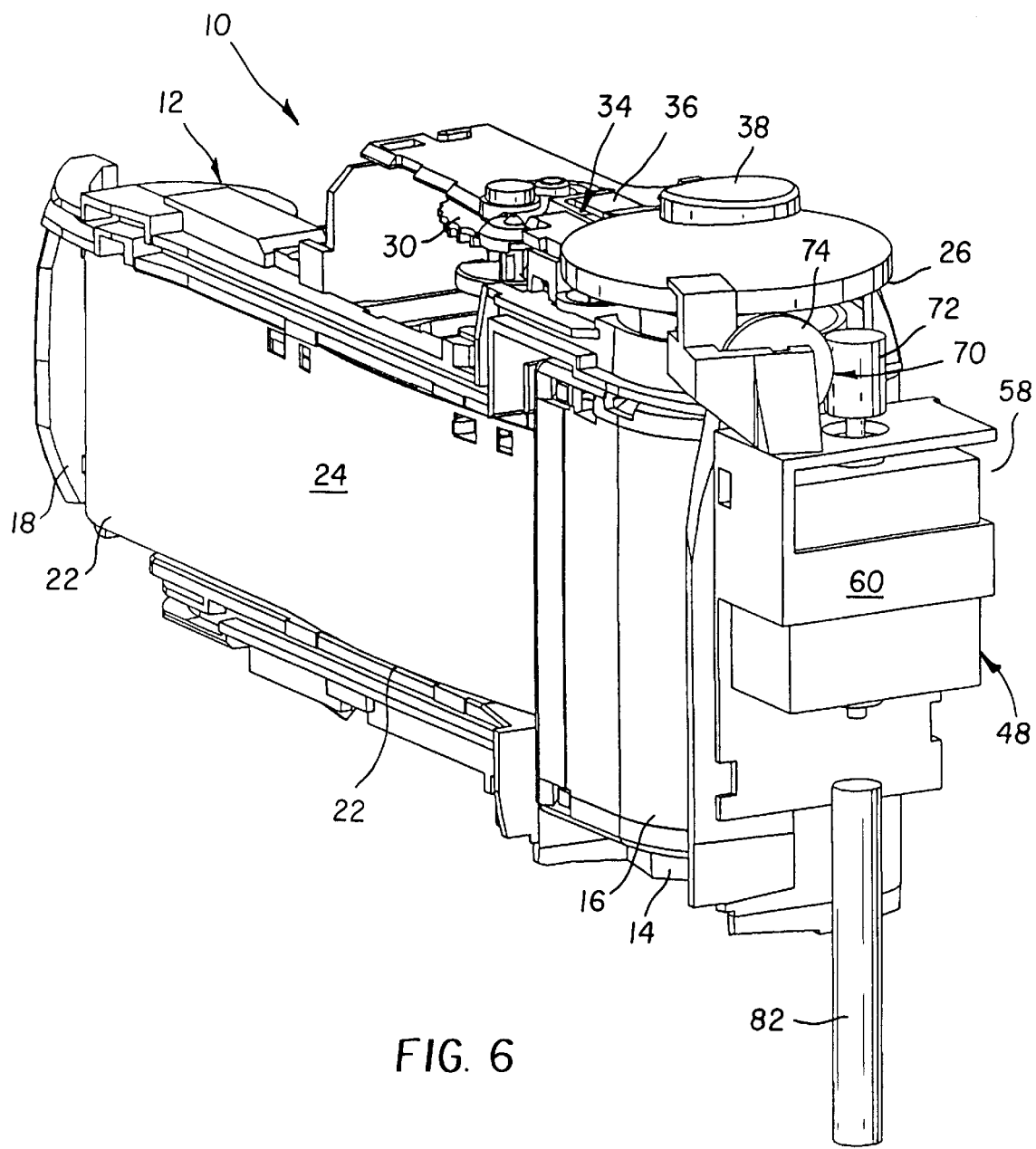
FIG. 6 is an assembled rear perspective view of the one-time-use camera, showing the film winding motor moved into engagement with the film winding device.

The film winding motor 60 is supported for movement along the main body part 12, substantially out of the pocket 48 as shown in FIG. 3, to a non-working position in which the worm gear 72 is disengaged from the annular gear 74. Conversely, the film winding motor 60 is supported for movement along the main body part 12, further back into the pocket 48 as shown in FIG. 6, to a working position in which the worm gear 72 is engaged with the annular gear 74. Releaseable engaging means (not shown) are provided on the main body part 12 and the film winding motor 60 for maintaining the film winding motor in its non-working and working positions.

Figure 2:
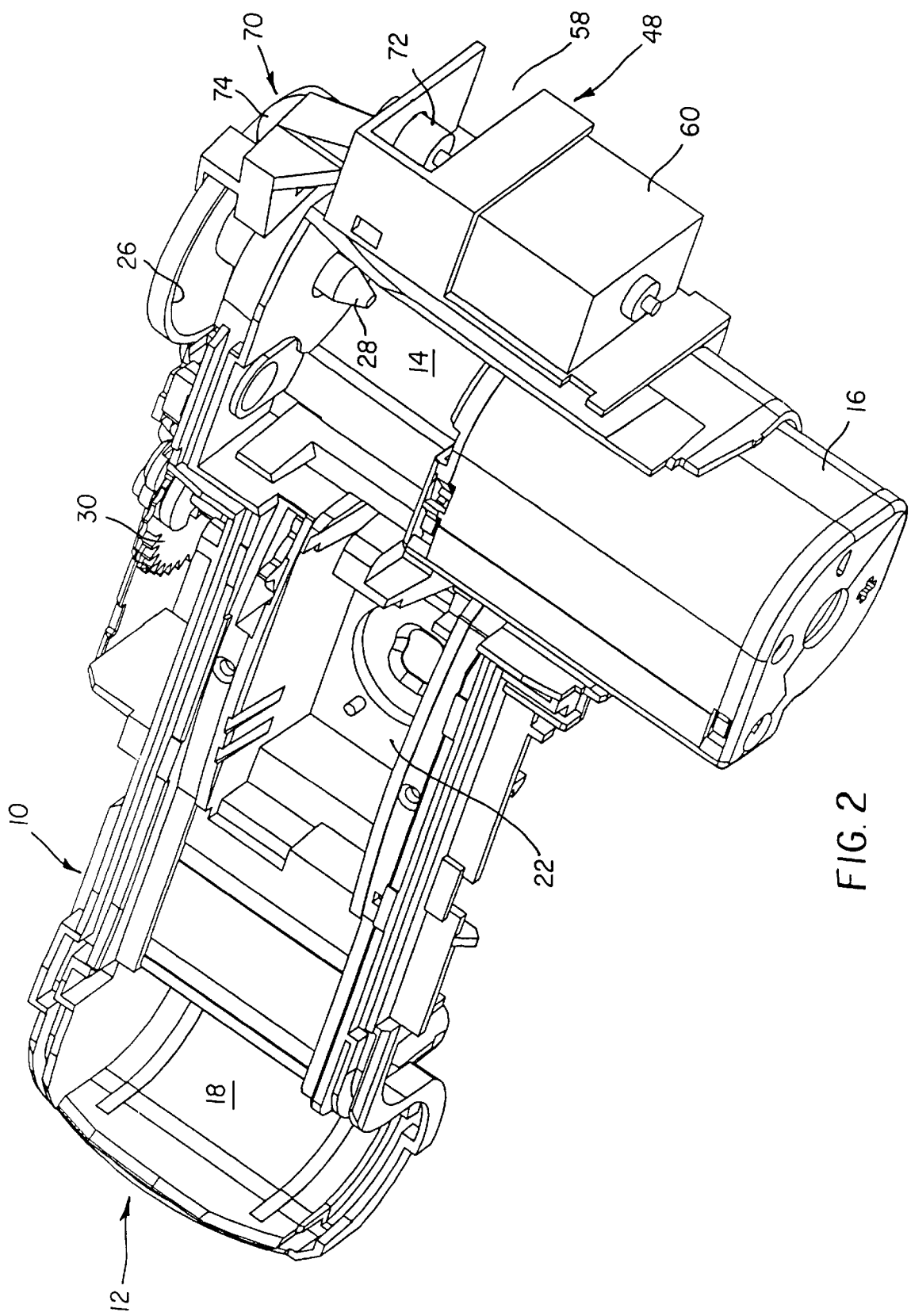
FIG. 2 is an assembled rear perspective view of the one-time-use camera, showing a film cartridge beginning to be inserted into the camera.
Figure 4:
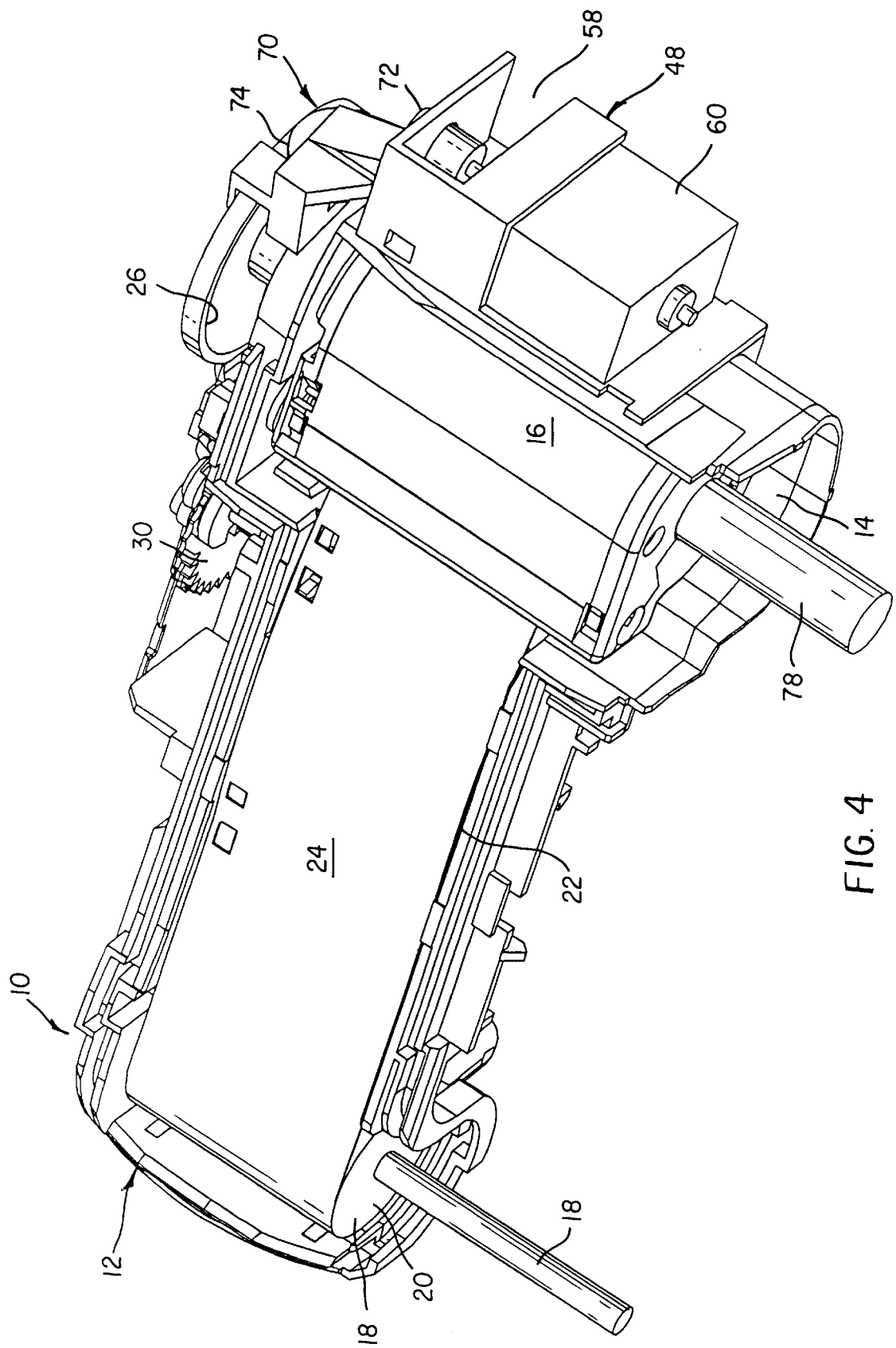
FIG. 4 is an assembled rear perspective view of the one-time-use camera, showing an unexposed filmstrip being prewound from the film cartridge into an unexposed film roll in the camera.

A film loading method for the one-time-use camera 10 is depicted in FIGS. 2–6. To begin with, the film winding motor 60 in its non-working position substantially out of the pocket 56 as shown in FIG. 2, i.e. the worm gear 72 is disengaged from the annular gear 74. In FIGS. 2 and 3, the film cartridge 16 is inserted into the cartridge receiving chamber 14. Then, a light lock within a film egress/ingress slot (not shown) in the film cartridge 16 is opened to permit a leading film end (not shown) to be advanced from the film cartridge. In FIG. 4, an unwinding pin 78 is engaged with the film spool (not shown) in the film cartridge 16 and is rotated counter-clockwise in FIG. 4 initially to advance the leading film end out of the film cartridge through the film egress/ingress slot. A winding pin 80 is attached to the leading film end at the film roll chamber 20. Then, the unwinding and winding pins 78 and 80 are rotated counter-clockwise in FIG. 4 to prewind the unexposed film strip 24 from the film cartridge 16 into the unexposed film roll 20 within the film roll chamber 18. Since the film winding motor 60 is in its non-working position substantially out of the pocket 48 as shown in FIG. 3, i.e. the worm gear 72 is disengaged from the annular gear 74, there is no impediment to unwinding rotation of the film winding ring gear 26 with the film spool in the film cartridge 16.

Figure 5:
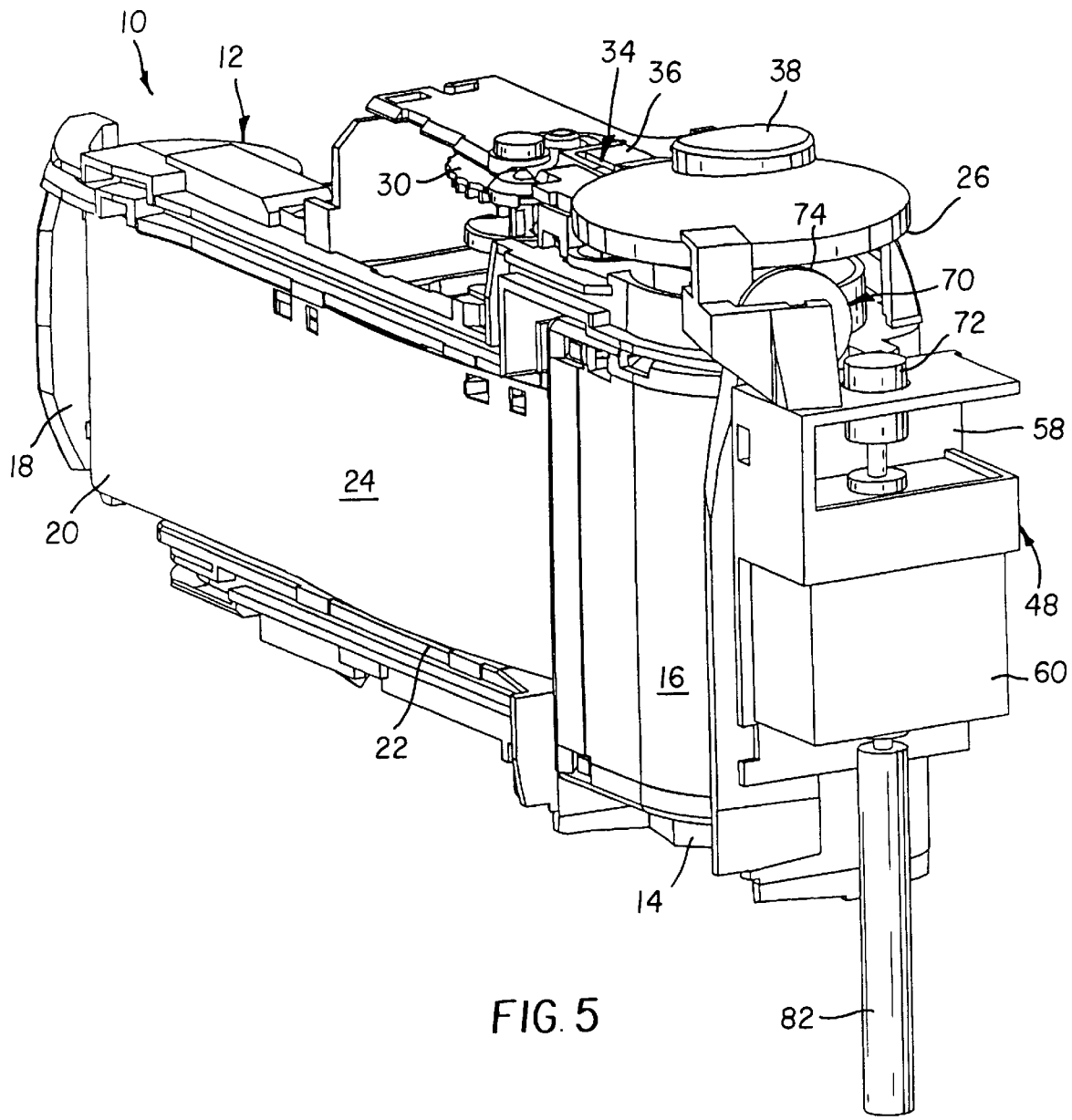
FIG. 5 is an assembled rear perspective view of the one-time-use camera, showing the film winding motor beginning to be moved toward a film winding device for winding successive exposed sections of the filmstrip into the film cartridge.

As shown in FIGS. 5 and 6, once the unexposed film roll 20 is fully formed in the film roll chamber 18, a push pin 82 is translated to push the film winding motor 60 to its working position further in the pocket 58, i.e. the worm gear 72 is engaged with the annular gear 74. Then, the push pin 82 is retracted from the film winding motor 60.

After the film loading method is completed, a pair of opaque front and rear covers (not shown) are attached to the main body part 12 to house the main body part between them, in order to complete the camera unit.

When the one-time-use camera 10 has been used, and it is desired to reload the camera with fresh film, the film winding motor 60 is moved along the main body part 12 from the working position in FIG. 6 to the non-working position in FIG. 2 before again beginning the film loading method.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part 14. cartridge receiving chamber
16. film cartridge
18. film roll or film supply chamber
20. unexposed film roll
22. backframe opening
24. filmstrip
26. film winding ring gear
28. coaxial stem
30. exposure counter
32. front exposure opening
34. shutter release component
36. cantilevered beam
38. shutter release button
40. actuating finger
42. right-angled tab
44. metering lever
46. high energy lever
48. mount
50. projection
52. projection
54. hole
56. hole
58. pocket
60. film winding motor
62. cradle slot
64. cradle slot
66. shaft end
68. shaft end
70. combination gear
72. worm gear
74. annular gear
76. pinion gear
78. unwinding pin
80. winding pin
82. push pin

What is claimed is:

1. A one-time-use camera comprising a film cartridge, a filmstrip that has been prewound from said film cartridge into an unexposed film roll, and a film winding device rotatable to wind successive exposed sections of said filmstrip into said film cartridge, is characterized in that:

a film winding motor is supported for movement to have respective separate positions in said camera not engaged with said film winding device, to permit said filmstrip to be prewound from said film cartridge into said unexposed film roll, and engaged with said film winding device, for rotating said film winding device to wind each exposed section of said filmstrip into said film cartridge.

2. A one-time-use camera as recited in claim 1, wherein a main body part has a cartridge receiving chamber for said film cartridge and a film supply chamber for said unexposed film roll and supports said film winding motor to be moved to said separate positions.

3. A one-time-use camera as recited in claim 1, wherein said film winding motor is supported to be moved back and forth between said separate positions to be moved into and out of engagement with said film winding device.

4. A film loading method for a one-time-use camera comprising the step of prewinding an unexposed filmstrip from a film cartridge within a cartridge receiving chamber of a main body part into an unexposed film roll within a film supply chamber of the main body part, is characterized by the further steps of:

maintaining a film winding motor supported on the main body part out of engagement with a film winding device windingly rotatable to wind successive exposed sections of the filmstrip into the film cartridge, in order to prevent the film winding motor from being an impediment to unwinding rotation of the film winding device when the unexposed filmstrip is prewound from the film cartridge into the unexposed film roll; and moving the film winding motor along the main body part into engagement with the film winding device, for the film winding motor to windingly rotate the film winding device to wind each exposed frame of the filmstrip into the film cartridge.

5. A method as recited in claim 4, characterized by the further step of:

moving the film winding motor along the main body part out of engagement with the film winding device, in order to permit the film winding motor to be maintained out of engagement with the film winding device when the film winding device is unwindingly rotated.

6. A method of readying a used one-time-use camera for reloading with an unexposed filmstrip to be prewound from a film cartridge within a cartridge receiving chamber of a main body part into an unexposed film roll within a film supply chamber of the main body part, comprising the step of:

moving a film winding motor along the main body part out of engagement with a film winding device windingly rotatable to wind successive exposed sections of the filmstrip into the film cartridge; and maintaining the film winding motor apart on the main body part from the film winding device, in order to prevent the film winding motor from being an impediment to unwinding rotation of the film winding device when the unexposed filmstrip is prewound from the film cartridge into the unexposed film roll.

7. A method of readying a used one-time-use camera reloaded with an unexposed filmstrip that has been prewound from a film cartridge within a cartridge receiving chamber of a main body part into an unexposed film roll within a film supply chamber of the main body part, and having a film winding device on the main body part windingly rotatable to wind successive exposed sections of the filmstrip into the film cartridge, is characterized by the step of:

moving a film winding motor along the main body part out of a position on the main body part disengaged from the film winding device to a position on the main body part engaged with the film winding device, in order to permit the film winding motor to windingly rotate the film winding device to wind each exposed section of the filmstrip into the film cartridge without having to separate said film winding motor from said main body part.

* * * * *